United States Patent
Thoma et al.

(10) Patent No.: US 6,850,326 B2
(45) Date of Patent: Feb. 1, 2005

(54) DETERMINATION OF AN OPTICAL PARAMETER OF AN OPTICAL SIGNAL

(75) Inventors: Peter Thoma, Rottenburg (DE); Emmerich Mueller, Aidlingen (DE); Tobias Ruf, Renningen (DE); Harald Rosenfeldt, Hamburg (DE)

(73) Assignee: Agilent Technologies, Inc., Palo Alto, CA (US)

( * ) Notice: Subject to any disclaimer, the term of this patent is extended or adjusted under 35 U.S.C. 154(b) by 79 days.

(21) Appl. No.: 10/059,702

(22) Filed: Jan. 29, 2002

(65) Prior Publication Data

US 2002/0186373 A1 Dec. 12, 2002

(30) Foreign Application Priority Data

Jun. 7, 2001 (EP) ............................................. 01113885

(51) Int. Cl.⁷ .................................................. G01J 4/00
(52) U.S. Cl. ...................................... 356/364; 356/365
(58) Field of Search ................................ 356/364–369; 385/11; 359/494, 498, 497; 250/225

(56) References Cited

U.S. PATENT DOCUMENTS

| | | | | |
|---|---|---|---|---|
| 3,689,163 A | * | 9/1972 | Glorioso .................... 356/400 |
| 3,927,945 A | | 12/1975 | Bates ......................... 356/106 |
| 4,042,302 A | | 8/1977 | Wentz ......................... 356/74 |
| 4,158,506 A | | 6/1979 | Collett ....................... 356/365 |
| 4,822,169 A | | 4/1989 | Distl et al. .................. 356/364 |
| 4,904,085 A | * | 2/1990 | Spillman, Jr. et al. ...... 356/364 |
| 5,545,980 A | * | 8/1996 | Nakamoto .................... 324/96 |
| 5,579,420 A | * | 11/1996 | Fukushima ................... 385/11 |
| 5,841,536 A | | 11/1998 | Dimmick ..................... 356/346 |
| 6,043,887 A | | 3/2000 | Allard et al. ............... 356/364 |
| 6,052,188 A | | 4/2000 | Fluckiger et al. ........... 356/369 |
| 6,118,537 A | * | 9/2000 | Johs et al. ................... 356/369 |
| 6,529,326 B2 | * | 3/2003 | Cai ............................ 359/498 |
| 2003/0075676 A1 | * | 4/2003 | Ruchet et al. .............. 250/225 |
| 2003/0086144 A1 | * | 5/2003 | Chou et al. ................. 359/246 |

FOREIGN PATENT DOCUMENTS

| | | |
|---|---|---|
| EP | 0 439 127 A2 | 7/1991 |
| JP | 2002-323676 | * 11/2002 |

OTHER PUBLICATIONS

Jacquin, J., Examiner European Search Report. Application No. EP 01 11 3885. dated Nov. 6, 2001.

* cited by examiner

Primary Examiner—Hoa Q. Pham

(57) ABSTRACT

An apparatus and a method of determination of at least one optical parameter of an optical signal includes providing a beam of the optical signal having a diameter, manipulating the beam, the manipulation having polarization properties, the properties being dependent of the position in the beam laterally with respect to a direction of propagation of the beam during manipulation, detecting in intensities at least three parts of the beam in their dependence of the position in the beam laterally with respect to a direction of propagation of the beam during detection.

17 Claims, 2 Drawing Sheets

DETERMINATION OF AN OPTICAL PARAMETER OF AN OPTICAL SIGNAL

BACKGROUND OF THE INVENTION

The determination of properties of optical components has become quite important in the last few years. However, polarization effects as polarization mode dispersion (PMD) or polarization dependent loss (PDL) influence the quality of the signal transmission because the transmission rates of optical communication links were continuously enhanced. Therefore, the measurement of PMD and of PDL are well-known when characterizing optical components (see L. E. Nelson, R. M. Jopson, H. Kogelnik, "Influence of Measurement Parameters on Polarization Mode Dispersion Measurements using the Signal Delay Method", Proc. ECOC 2000, Munich, Germany Vol. I (3.4.4), pp. 143–144 (2000); and A. Galtarossa, L. Palmieri, M. Schiano, T. Tambosso, "Improving the Accuracy of the Wavelength-Scanning Technique for PMD Measurements", IEEE Photonics Technology Letters 12(2), pp. 184–186 (2000)). Moreover the precise measurement of polarization and the degree of polarization (DOP) are useful for compensation of PMD (see N. Kikuchi, S. Sasaki, "Polarization-Mode Dispersion (PMD) Detection Sensitivity of Degree of Polarization Method for PMD Compensation", Proc. ECOC'99, Nice, France Vol. II (WeA1.3) pp. 8–9 (1999); and H. Rosenfeldt, R. Ulrich, U. Feiste, R. Ludwig, H. G. Weber, A. Ehrhardt, "PMD compensation in 10 Gbit-s NRZ field experiment using polarimetric error signal", Electronics Letters 36(5), pp. 448-449 (2000)).

However, polarimeters of the prior art require a lot of beam splitters, polarizers and detectors, thereby negatively influencing the production costs of such polarimeters. In addition it is necessary to precisely adjust such components with respect to each other. An example of a polarimeter of the prior art is shown in Dennis Derickson "Fiber optic, Test and Measurement", Prentice Hall PTR, Upper Saddle River, N.J. 07458, pp. 231–232 (1998). The polarimeter shown in this publication uses one four-way beam splitter, three linear polarizers, one quarter-wave plate and four detectors to evaluate the Stokes parameters.

EP-A-439127 discloses a fast polarization meter for measuring the polarization of a light beam by splitting it up into four beams, individually analyzing each beam, and calculating the Stokes parameter from the results. Other optical analysis devices are known e.g. from U.S. Pat. No. 5,841, 536 and U.S. Pat. No. 3,927,945 (wavemeters), U.S. Pat. No. 6,052,188 (spectroscopic ellipsometer), U.S. Pat. No. 6,043, 887 (polarimeter), U.S. Pat. No. 4,042,302 (broadband wavelength discriminator), or U.S. Pat. No. 4,822,169 (analyzer).

U.S. Pat. No. 4,158,506 discloses an electro-optical system for determining the polarization state of optical pulses of nanosecond durations. The output from six optical polarizers each with a different polarization is detected with six detectors, whereby the polarizations of the polarizers is selected in a way that the Stokes parameter can be directly received from the detected output signals.

SUMMARY OF THE INVENTION

Therefore, it is an object of the invention to provide improved determination of an optical parameter of an optical signal. The object is solved by the independent claims.

One of the main features of the present invention is the combination of two steps, both dependent on the position in the beam. The first position dependent step is the manipulation of the beam, wherein the manipulation having polarization properties, the properties being dependent of the position in the beam laterally with respect to a direction of propagation of the beam during this manipulation. This is combined with the second step of detecting intensities in at least three, preferably four, parts of the beam in their dependency of the position in the beam laterally with respect to a direction of propagation of the beam during this detection. Based on this combination it is possible to derive an optical parameter, e.g. the wavelength or the state of polarization of the signal, on the basis of the detected intensities. For this evaluation the invention uses the perception that the detected intensities are correlated to a vector, preferably the Stokes vector, describing the optical parameter, e.g. the state of polarization, by a certain matrix. Since it is possible to built up this matrix for a certain position dependency of the polarization properties of the manipulation step and since it is possible to invert this matrix it is also possible to derive the vector, preferably the Stokes vector from the detected intensities. For this purpose it is preferred to detect intensities in four different parts of the beam to be able to derive all four vector elements of the vector, preferably the Stokes vector, unambiguously at once. If only three different parts are detected then the vector, preferably the Stokes vector, cannot be fully determined and a priori information, for example about the DOP can help to derive the complete vector, preferably the Stokes vector.

In a preferred embodiment of the invention the manipulation of the beam is done by retarding the beam, the retardation being dependent of the position in the beam laterally with respect to a direction of propagation of the beam during retardation, and polarizing the beam using a known polarization. With this combination the inventive manipulation step can be realized very easily. Moreover, if the beam is provided with a known wavelength, it is possible in a preferred embodiment to evaluate as an optical parameter the state of polarization of the signal.

Preferably, the polarization properties of the manipulation step are a linear function of the position in the beam. Moreover, it is preferred that the retardation is a linear function of the position in the beam. Additionally, it is preferred that the detection being a non-linear function of the position in the beam. In other preferred embodiments the spatially linear variation (and even nonlinear variations) of the retardation may be caused by other means, for example by using liquid or ferroelectric crystals and by applying an electric field to these elements.

A separate aspect of the invention for which aspect is claimed independent protection, also, is an element for manipulating an optical signal which comprises at least two sub-elements, each of these sub-elements having a variation in their polarization manipulation property along one of its axes and these axes have some angle with respect to each other. Preferably each of the sub-elements is a retardation element. More preferred, each of the sub-elements has the shape of a wedge.

In a further embodiment of the above-mentioned invention the manipulation element can comprise such an element, also.

If the beam is provided with a known state of polarization it is possible within a preferred embodiment to evaluate as an optical parameter the wavelength of the signal, i.e. to provide a wavelength sensor or wavemeter.

In another preferred embodiment of the invention the wedge-shaped retardation plates are positioned in the path of the beam such that their axes of the extraordinary index of refraction have some angle with respect to each other, preferably an angle not equal to 45°, 135°, 225°, 315°. This choice of angles as well as the choice of the appropriate retardation guarantees that all Stokes parameters can be determined unambiguously. Other arrangements with crystals having different birefringent properties may also ensure that all Stokes parameters can be determined unambiguously.

An advantage of the present invention is therefore the provision of a method and an apparatus which provide high precision measurement of the optical parameter with an apparatus having a small number of parts, in particular of a low cost, small form factor and high precision wavelength sensor and a low cost and high precision polarimeter without the need for using a large number of different parts which have to be adjusted with respect to each other.

In a preferred embodiment of the invention the wavelength sensor is realized by splitting the beam into a first and a second beam, providing the first beam with a known first polarization, providing the second beam with a known second polarization, detecting the intensities of the first and the second beam in their dependence on the position in the beam laterally with respect to a direction of propagation of the beam, and evaluating as an optical parameter the wavelength of the initial beam. Therefore, this embodiment makes it possible to evaluate the wavelength of a beam just by using the inventive manipulation and detection facilities that are dependent on the position in the beam.

Another preferred embodiment of the invention combines the wavelength sensor with the polarization sensor. The incident light of unknown wavelength and unknown state of polarization is split into three beams. Two of these beams are used to prepare well-defined states of polarization for a wavelength measurement. The third beam is used to determine the state of polarization. The parallel measurement of wavelength and state of polarization, which is made possible by this part of the invention, enables to "compensate" for the wavelength dependence of an arrangement for measuring the state of polarization. This presents a considerable advantage. Many of the possible expansions described below also apply here, especially the fact that all three beams may be steered such that they pass through or directed to the same optical devices such as retarders and polarizers.

In another example of the invention the evaluating of the optical parameter is done by describing the effect of the manipulation step with the help of a matrix, by inverting the matrix and by multiplying the vector of the detected intensities with the inverted matrix to get the Stokes parameters of the optical signal. In this respect it is preferred to find the matrix by performing a calibration procedure for determination of each matrix element. This calibration procedure can be done by using several defined states of polarization for the initial beam so that by the detected intensities the effect of the manipulating step can be evaluated and therefore the matrix elements can be evaluated. Another possibility for calibration is to use unknown states of polarization of the initial beam but fully polarized (DOP=1) initial beams, using a first approximation for the matrix and then using known methods for searching the gradient of the real matrix of the manipulation step.

Other preferred embodiments are shown by the dependent claims.

It is clear that the invention can be partly embodied or supported by one or more suitable software programs, which can be stored on or otherwise provided by any kind of data carrier, and which might be executed in or by any suitable data processing unit.

BRIEF DESCRIPTION OF THE DRAWINGS

Other objects and many of the attendant advantages of the present invention will be readily appreciated and become better understood by reference to the following detailed description when considering in connection with the accompanied drawings. The components in the drawings are not necessarily to scale, emphasis instead being placed upon clearly illustrating the principles of the present invention. Features that are substantially or functionally equal or similar will be referred to with the same reference sign(s).

DETAILED DESCRIPTION OF THE INVENTION

Figure 1:
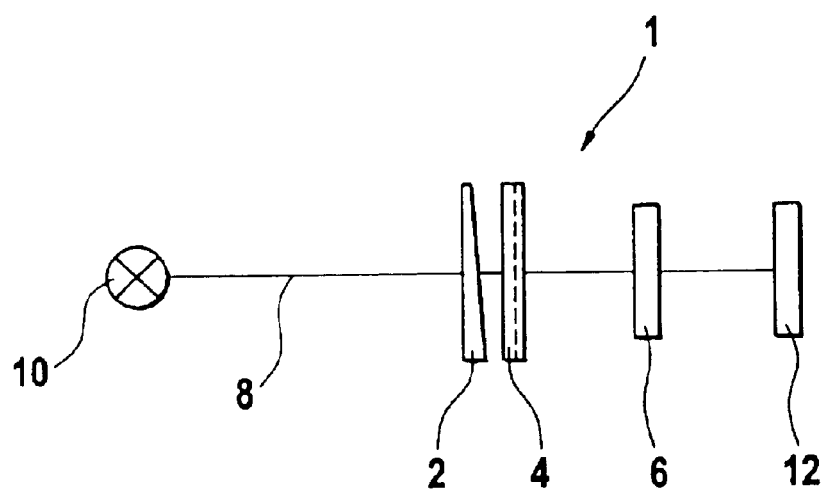
FIGS. 1–3 show preferred embodiments of the present invention.

Referring now in greater detail to the drawings, FIG. 1 shows a first embodiment 1 of the present invention. Embodiment 1 realizes a polarimeter and uses two optical retardation plates 2 and 4 and a linear polarizer 6 to achieve a position-dependent retardation and thus a polarization-sensitive intensity variation across the diameter of an expanded preferably parallel beam 8 originating from a laser source 10. This variation is detected in the different segments of a four-quadrant detector 12. From the different intensities measured, it is possible to determine the complete state of polarization (e.g. the four Stokes parameters) of the incident light, assuming that its wavelength is known. This determination is done with the help of the above-referenced inverted matrix.

In embodiment 1 there are used birefringent optical retardation plates 2 and 4 which have nonparallel planar surfaces. For this purpose plates 2 and 4 are shaped like a wedge. This causes a linear variation of the retardation across the plates 2, 4. To detect all states of polarization unambiguously with the single four-quadrant detector 12, the two retarders 2, 4 are positioned in the path of the beam 8 such that their axes of the extraordinary index of refraction (uniaxial direction, in the plane of the plates) have some angle with respect to each other.

Figure 2:
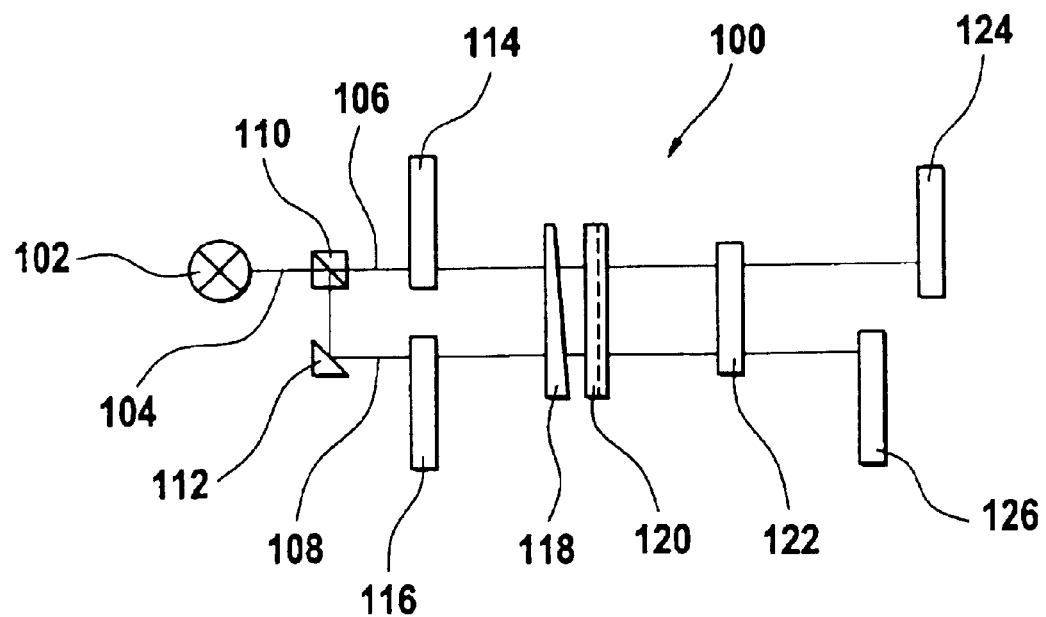

FIG. 2 shows a second embodiment 100 of the present invention. Embodiment 100 realizes a wavelength sensor. In embodiment 100 the incident light originating from a laser source 102 is expanded into a preferably parallel beam 104 and then separated into two beams 106 and 108 by means of a polarizing beam splitter 110 and deflecting means 112, e.g. a mirror or a beam steering prism. Subsequently, polarization means 114 and 116 are used to create two well-defined states of polarization, e.g. horizontal (H) and vertical (V). Alternatively (not shown), a non-polarizing beam splitter may be used and the two different states of polarization are solely created by the polarization means. In some cases, even the polarization created by the polarizing beam splitter may be sufficient. Here are used two different but well-defined states of polarization to provide a sufficiently strong signal on one channel in those situations where the signal of the other channel vanishes, respectively, due to polarizer extinction. Also, favorable states of polarization are chosen such that the largest possible signal variations (dynamic range) further down the beam path (at the detectors, see below) are obtained.

After the polarization means 114 and 116, the two beams 106 and 108 pass an arrangement of two retardation plates 118 and 120. As in the embodiment of FIG. 1, these plates 118 and 120 have planar but nonparallel surfaces. Therefore, they exhibit a linearly varying retardation across their diameter. The optical axes (of birefringence) of the plates 118 and 120 are in the plane of the retardation plates 118 and 120 and are aligned under some angle. The purpose of this arrangement is to manipulate the states of polarization of the two (expanded) beams 106 and 108 in a controlled and spatially varying fashion. Both parallel beams 106, 108 pass through the same retardation plates 118, 120 in different areas, thus using them in an economic fashion.5

After the retardation plates 118, 120, the light of the beams 106, 108 passes through a linear polarizer 122 and hits the different segments of four-quadrant detectors 124 and 126. A single polarizer 122 is used for both beams 106, 108. The wavelength information is then derived from the signal intensities registered in the different segments of both detectors 124, 126 with the help of the above mentioned inverted matrix.

With embodiment 100 light of unknown wavelength and state of polarization is prepared with defined states of polarization in order to obtain the wavelength information alone. In embodiment 1 this is not possible with an unknown wavelength, because the phase shift in the retarder plates 2, 4 depends on both, wavelength and state of polarization. In embodiment 100 it is achieved a separation of these two effects and therefore it is possible to obtain information on a single quantity, i.e. the wavelength.

Similar information may also be obtained with a single four-quadrant detector (not shown) when using a switching or other appropriate beam steering means, that allows one to subsequently hit the detector area with one or the other of the two beams 106, 108, possibly e.g. in a periodically oscillating fashion. Other position-sensitive detectors, like arrays, may also be used in order to detect the signals from the two beams 106, 108, either in parallel or sequentially. The use of four quadrants is driven by the minimum number of independent information channels that give the complete unambiguous information about all four parameters describing a polarization state. More detectors may be used as well.

Figure 3:
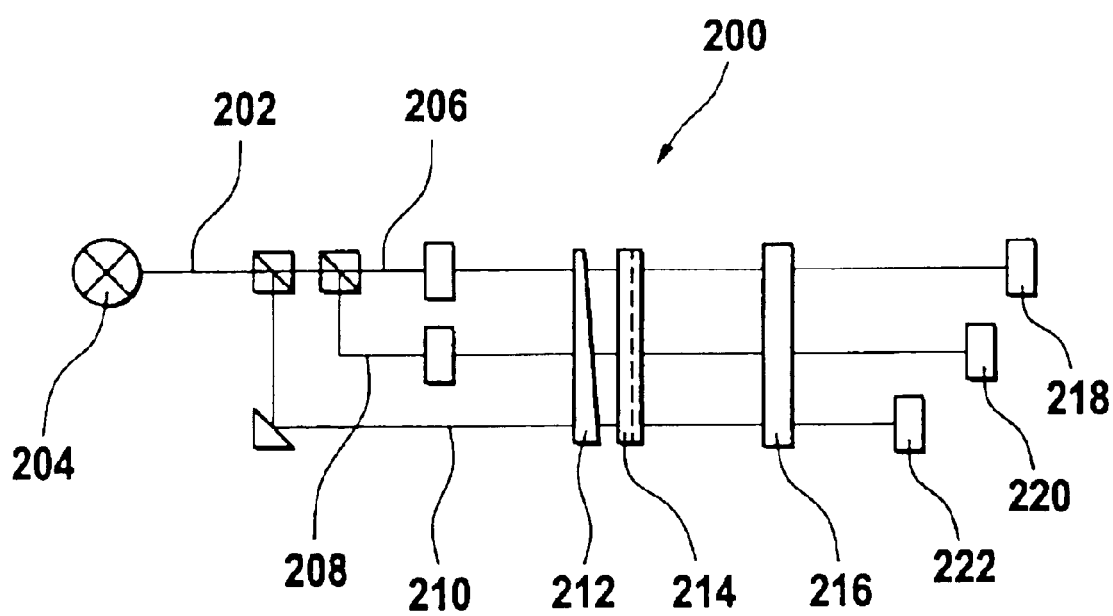

In addition, the wavelength sensor of the second embodiment 100 can be combined with the polarization sensor of the first embodiment 1 in order to measure both, the wavelength and the complete state of polarization of the incident light beam in one instrument. This instrument is shown in the third embodiment 200 according to FIG. 3. The incident light 202 of a laser source 204 of unknown wavelength and state of polarization is split into three beams 206, 208, 210. Beams 206 and 208 are used to prepare well-defined states of polarization for a wavelength measurement. The third beam 210 is used to determine the state of polarization. In embodiment 200 all three beams 206, 208, 210 are steered such that they pass through the same retarders 212, 214 and polarizer 216. At the end the beams 206, 208, 210 hit three four-quadrant detectors 218, 220 and 222. The evaluation of wavelength and state of polarization is done with the help of the above-mentioned inverted matrix, similarly to the determination as in the other embodiments 1, 100.

What is claimed is:

1. A method of determination of at least one optical parameter of an optical signal, comprising:
    manipulating a beam of the optical signal, the manipulation having polarization properties, the properties being dependent of the position in the beam laterally with respect to a direction of propagation of the beam during manipulation, wherein the beam is manipulated by:
    retarding the beam, the retardation being dependent of the position in the beam laterally with respect to a direction of propagation of the beam during retardation, and
    polarizing the beam using a known polarization;
    detecting intensities in at least three parts of the beam in their dependency of the position in the beam laterally with respect to a direction of propagation of the beam during detection, and
    evaluating the optical parameter on the basis of the detected intensities.

2. The method of claim 1, wherein the manipulation comprises the manipulation of the power transmission of at least a part of the beam, the manipulation of the power transmission being dependent of the position in the beam laterally with respect to a direction of propagation of the beam during manipulation of the power transmission, and being dependent of the polarization of said part of the beam.

3. The method of claim 1, further comprising:
    providing the beam with a known wavelength, and
    evaluating as an optical parameter the state of polarization of the signal.

4. The method of claim 1, further comprising:
    providing the beam with a known state of polarization, and
    evaluating as an optical parameter the wavelength of the signal.

5. The method of claim 1, further comprising:
    splitting the beam in a first and at least a second beam,
    providing the first beam with a known first polarization before manipulating,
    providing the second beam with a known second polarization before manipulating,
    detecting the intensity of the first beam in its dependence on the position in the first beam laterally with respect to a direction of propagation of the first beam during detection,
    detecting the intensity of the second beam in its dependence on the position in the second beam laterally with respect to a direction of propagation of the second beam during detection, and
    evaluating as an optical parameter the wavelength of the beam.

6. The method of claim 1, further comprising the steps of evaluating the optical parameter by:
    describing the effect of the manipulation step with the help of a matrix,
    inverting the matrix, and
    multiplying the detected intensities with the inverted matrix to get the Stokes parameters for the optical signal.

7. The method of claim 1, wherein the dependence of the properties of the manipulation from the position in the beam is sufficient to make the matrix invertible.

8. The method of claim 1, wherein the detection is a detection of four different parts of the beam.

9. The method of claim 1, further comprising:
    splitting the beam in a first, a second and a third beam,
    providing the first beam with a known first polarization before manipulation,
    providing the second beam with a known second polarization before manipulation,
    detecting the intensity of the first beam in its dependence on the position in the first beam laterally with respect to a direction of propagation of the first beam during detection,
    detecting the intensity of the second beam in its dependence on the position in the second beam laterally with respect to a direction of propagation of the second beam during detection, detecting the intensity of the third beam in its dependence on the position in the beam laterally with respect to a direction of propagation of the third beam during detection, evaluating as an optical parameter the wavelength of the beam on the basis of the detected intensities of the first and the second beam, and evaluating as an optical parameter the state of polarization of the beam on the basis of the detected intensity of the third beam.

10. A software program, stored on a data carrier, for executing a method for determining at least one optical parameter of an optical signal, when run on a data processing system, said method comprising:

manipulating a beam of the optical signal, the manipulation having polarization properties, the properties being dependent of the position in the beam laterally with respect to a direction of propagation of the beam during manipulation, wherein the beam is manipulated by:

retarding the beam, the retardation being dependent of the position in the beam laterally with respect to a direction of propagation of the beam during retardation, and polarizing the beam using a known polarization;

detecting intensities in at least three parts of the beam in their dependency of the position in the beam laterally with respect to a direction of propagation of the beam during detection, and evaluating the optical parameter on the basis of the detected intensities.

11. An apparatus for determination of at least one optical parameter of an optical signal, comprising:

an element in a path of a beam of the optical signal for manipulating the beam, the manipulation having polarization properties, the properties being dependent on the position in the beam laterally with respect to a direction of propagation of the beam during the manipulation, a detector element in the path for detecting the intensities in at least three parts of the beam in their dependency on the position in the beam laterally with respect to a direction of propagation of the beam during detection, and an evaluating unit connected to the detector element for evaluating the optical parameter on the basis of the detected intensities, wherein the element further comprises:

at least one retardation element in the path, the retardation of the retardation element being a function of the position in the beam laterally with respect to a direction of propagation of the beam during retardation, and at least one polarization element in the path with a known polarization effect on the signal.

12. The apparatus of claim 11, wherein the retardation element comprises at least two retardation plates in the path, the retardation being a linear function of the position in the beam.

13. The apparatus of claim 11, wherein at least one of the retardation plates has non-parallel surfaces.

14. The apparatus of claim 11, wherein the retardation plates are positioned in the path such that their axes of the extraordinary index of refraction have some angle with respect to each other.

15. The apparatus of claim 11, further comprising:

a first beam splitter in the path between the light source and the element for providing a first beam traveling a first path and a second beam traveling a second path, a first polarization element in the first path for providing the first beam with a known polarization, and a second polarization element in the second path for providing the second beam with a known second polarization, wherein the detector element is in the path of the first and of the second polarized beam for detecting the intensity of the beam in its dependency of the position in the beams laterally with respect to a direction of propagation of the beams during detection.

16. The apparatus of claim 11, further comprising:

a first and a second beam splitter in the path between the light source and the element for splitting the beam in a first beam traveling a first path, a second beam traveling a second path and a third beam traveling a third path, a first polarization element in the first path for providing the first beam with a known first polarization, and a second polarization element in the second path for providing the second beam with a known second polarization, wherein the detector element is in the paths of the first, the second and the third beam for detecting the intensities of the beams in their dependency of the position in the respective beam laterally with respect to a direction of propagation of the respective beam during detection, and wherein the evaluating unit evaluates, as an optical parameter, the wavelength of the beam on the basis of the detected intensities of the first and the second beam and evaluates the state of polarization of the beam on the basis of the detected intensities of the third beam.

17. The apparatus of 11, wherein the element comprises at least two sub-elements, each having at least one body axis, each of these sub-elements having a variation in a manipulation property along its axis and these axes have some angle with respect to each other.

* * * * *